United States Patent
Kanai et al.

(10) Patent No.: US 8,271,853 B2
(45) Date of Patent: Sep. 18, 2012

(54) CACHE MEMORY, COMPUTER SYSTEM AND MEMORY ACCESS METHOD

(75) Inventors: Tatsunori Kanai, Yokohama (JP); Yutaka Yamada, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 785 days.

(21) Appl. No.: 12/393,256

(22) Filed: Feb. 26, 2009

(65) Prior Publication Data

US 2009/0319865 A1 Dec. 24, 2009

(30) Foreign Application Priority Data

Jun. 24, 2008 (JP) ................................ 2008-164214

(51) Int. Cl.
*H03M 13/00* (2006.01)
(52) U.S. Cl. ...................................................... 714/763
(58) Field of Classification Search .................... 714/42, 714/702–705, 718–720, 743, 763–766, 768, 714/801, 805
See application file for complete search history.

(56) References Cited

U.S. PATENT DOCUMENTS

| | | | | |
|---|---|---|---|---|
| 5,502,728 A * | 3/1996 | Smith, III | ..................... | 714/5.11 |
| 5,533,035 A * | 7/1996 | Saxena et al. | ................. | 714/761 |
| 6,804,799 B2 * | 10/2004 | Zuraski, Jr. | ..................... | 714/54 |
| 7,971,124 B2 * | 6/2011 | Spanel et al. | ................. | 714/768 |
| 2002/0069330 A1 * | 6/2002 | Chauvel et al. | ............... | 711/141 |
| 2002/0078268 A1 * | 6/2002 | Lasserre | ......................... | 710/22 |
| 2004/0054849 A1 * | 3/2004 | Deenadhayalan et al. | .... | 711/112 |
| 2008/0222358 A1 * | 9/2008 | Emma et al. | ................. | 711/122 |
| 2008/0301530 A1 * | 12/2008 | Spanel et al. | ................ | 714/765 |

FOREIGN PATENT DOCUMENTS

JP 08-137748 5/1996

* cited by examiner

*Primary Examiner* — Nadeem Iqbal
(74) *Attorney, Agent, or Firm* — Turocy & Watson, LLP

(57) ABSTRACT

A cache memory has a data holding unit having multiple cache lines each of which includes an address area, a data area and a dirty bit, and a controller which is given read data and a correction execution signal indicating whether or not error correction has been performed for the read data, the read data has been read from a memory storing error-correction-coded data, which also stores address information corresponding to the read data into the address area of any one of the multiple cache lines, stores the read data into the data area, and sets a predetermine value as the dirty bit on the basis of the correction execution signal.

9 Claims, 5 Drawing Sheets

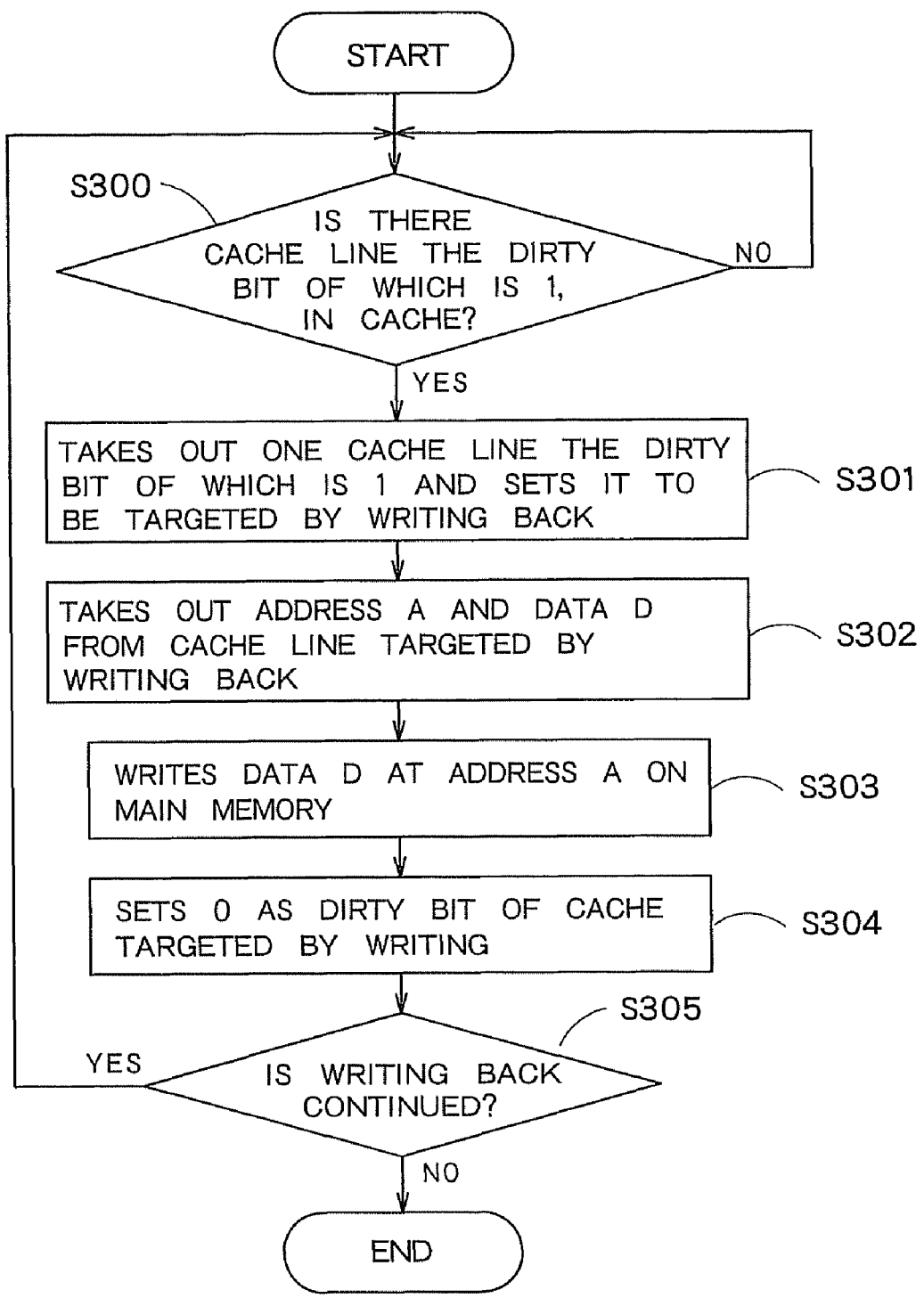
F I G. 4

CACHE MEMORY, COMPUTER SYSTEM AND MEMORY ACCESS METHOD

CROSS REFERENCE TO RELATED APPLICATION

This application is based upon and claims benefit of priority from the Japanese Patent Application No. 2008-164214, filed on Jun. 24, 2008, the entire contents of which are incorporated herein by reference.

BACKGROUND OF THE INVENTION

1. Field of the Invention

The present invention relates to a cache memory, a computer system and a memory access method.

2. Related Art

In a computer system, correct processing cannot be continued if data stored in the main memory is destroyed, and influence of the data destruction is avoided by restoring the destroyed data using an error correcting code (ECC).

Data destruction is caused by various factors such as cosmic rays and heat. For example, in a memory such as an MRAM, a phenomenon called read disturbance, in which stored values are inverted, occurs accompanying a data reading operation, and thereby data is destroyed, though the occurrence probability is low. Since the read disturbance is a physical phenomenon which probabilistically occurs, it is difficult to suppress the probability to zero. Furthermore, when the reading voltage is raised to increase the access speed, the occurrence probability of the read disturbance becomes higher.

Phenomena similar to the read disturbance of an MRAM also occur in various kinds of non-volatile memories, such as an ReRAM, an FeRAM and a flash memory. Therefore, it is necessary to take measures therefor, such as use of an ECC.

Generally, in a computer system, there is provided a cache memory, which is a high-speed storage device, between a main memory and a processor and data frequently used are stored in the cache memory to reduce accesses to the low-speed main memory and speed up processing. Data read from the main memory is stored into the cache memory. Furthermore, data rewritten by the processor is written back to the main memory (see, for example, JP-A 8-137748(KOKAI)).

Conventionally, when data read from the main memory is corrected with an ECC, the processor often does not perform any special processing because it can obtain correct data which has been corrected. In some cases, it is communicated to the processor by interruption that the data correction with an ECC has occurred, and, in response thereto, the operating system on the processor performs processing, such as for gathering statistic information and for preventing the area on the main memory where the corrected data has been stored from being used.

In the case of having corrected data destruction which probabilistically occurs, such as read disturbance of an MRAM, with an ECC, there is a possibility that, when data at the same address is read next, different data is further destroyed. Therefore, it is necessary to certainly write back the data corrected with the ECC from the cache memory to the main memory.

However, in the conventional computer system described above, since it is notified by interruption that correction has been performed with an ECC, and the operating system operates and performs necessary processing, it is not ensured that correct data which has been corrected with the ECC remains in the cache memory at the time of the processing. For example, there is a possibility that the data corrected with the ECC is driven out of the cache memory by data read later and it disappears. If the data does not remain in the cache memory, it is read again from the main memory, which causes a problem that the processing speed is decreased.

SUMMARY OF THE INVENTION

According to one aspect of the present invention, there is provided a cache memory comprising:

a data holding unit having multiple cache lines each of which includes an address area, a data area and a dirty bit; and a controller which is given read data and a correction execution signal indicating whether or not error correction has been performed for the read data, the read data has been read from a memory storing error-correction-coded data, which also stores address information corresponding to the read data into the address area of any one of the multiple cache lines, stores the read data into the data area, and sets a predetermine value as the dirty bit on the basis of the correction execution signal.

According to one aspect of the present invention, there is provided a computer system comprising:

a main memory in which error-correction-coded data is stored;

an error correction circuit which performs error correction coding of data to be written into the main memory, error correction decoding of data read from the main memory, and error presence/absence detection, corrects the error if detecting any error in the data read from the main memory, and outputs a correction execution signal indicating whether or not error correction has been made;

a processor which outputs a reading instruction and a reading address; and a cache memory having multiple cache lines each of which includes an address area, a data area and a dirty bit, and a cache controller which reads data from the reading address on the main memory via the error correction circuit on the basis of the reading instruction, stores the reading address into the address area of any one of the multiple cache lines, stores the read data into the data area, and sets a predetermined value as the dirty bit on the basis of the correction execution signal.

According to one aspect of the present invention, there is provided a memory access method comprising:

receiving a reading instruction and a reading address from a processor;

comparing the address stored in the address area of each of multiple cache lines included in a cache memory with the reading address;

reading error-correction-coded data corresponding to the reading address which is stored in a main memory if the addresses do not correspond to each other as the result of the comparison;

performing error correction decoding of the read data;

detecting presence/absence of an error in the read data;

correcting the read data if there is any error in the data, and outputting a correction execution signal indicating that correction has been performed;

storing the corrected data into the data area of any one of the multiple cache lines;

storing the reading address into the address area of the cache line;

setting 1 as the dirty bit of the cache line on the basis of the correction execution signal; and transmitting the data stored in the data area to the processor.

BRIEF DESCRIPTION OF THE DRAWINGS

FIG. 4 is a flowchart illustrating data writing-back processing according to the embodiment.

DESCRIPTION OF THE EMBODIMENTS

An embodiment of the present invention will be described on the basis of drawings.

Figure 1:
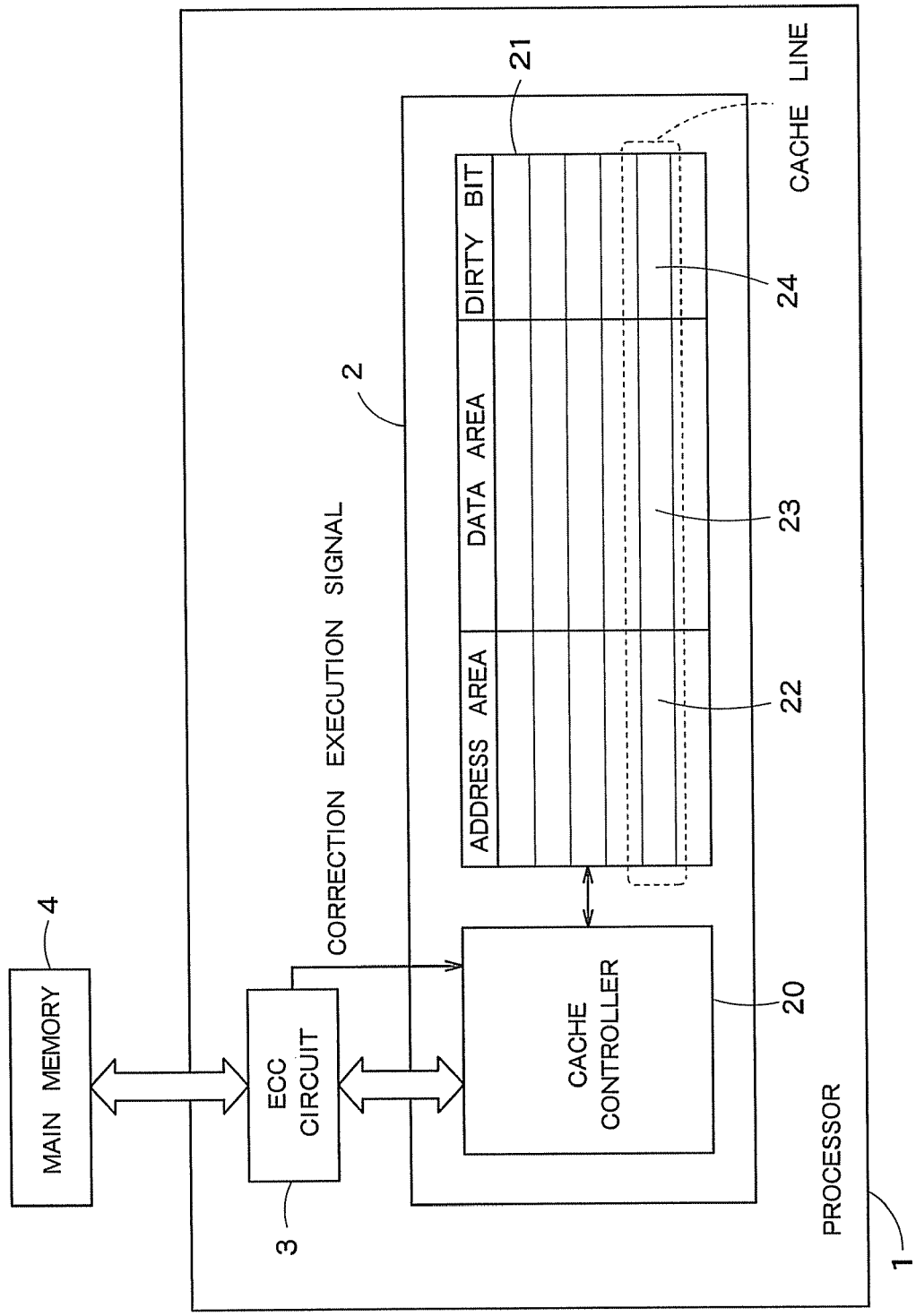
FIG. 1 is a block diagram of a computer system which includes a cache memory according to an embodiment of the present invention.

As shown in FIG. 1, a cache memory 2 and an ECC circuit 3 are included in a processor 1. The processor 1 can access the cache memory 2, read data held by the cache memory 2, and write data into the cache memory 2.

The ECC circuit 3 is provided between the cache memory 2 and a main memory 4. The cache memory 2 writes (writes back) and reads data to and from the main memory 4 via the ECC circuit 3.

The ECC circuit 3 performs ECC coding when writing data which is stored in the cache memory 2 to the main memory 4. The ECC-coded data is written to the main memory 4.

Furthermore, the ECC circuit 3 performs ECC decoding when reading data which is stored in the main memory 4 to the cache memory 2 and detects whether there is an error in the data. If there is any error in the data, the ECC circuit 3 corrects the error and then outputs the data to the cache memory 2. Furthermore, the ECC circuit 3 outputs a correction execution signal indicating that it has performed the error correction, to the cache memory 2.

As shown in FIG. 1, the cache memory 2 has a cache controller 20 and a cache data holding section 21. The cache controller 20 is a controller for the cache memory 2, and it executes, for example, reading of data stored in the cache data holding section 21 in response to access from the processor 1.

The cache data holding section 21 is constituted by multiple cache lines, and each cache line has an address area 22, a data area 23 and a dirty bit 24. In the data area 23, data read from the main memory 4 is stored. In the address area 22, an address on the main memory 4 corresponding to the data in the data area 23 is stored. The dirty bit 24 indicates whether it is necessary to write back the data in the data area 23 to the main memory 4 or not.

When the processor 1 accesses the cache memory 2, and the accessed address is stored in the address area 22 of a cache line, it is a cache hit, and the processor 1 performs processing using data held by this cache line.

When the processor 1 accesses the cache memory 2, and the accessed address is not stored in the address area 22 of any cache line, it is a cache miss. In this case, the cache memory 2 (the cache controller 20) acquires data on the main memory 4 onto a cache line via the ECC circuit 3 to respond to the access from the processor 1.

If data D on a cache line and the data on the main memory 4 do not correspond to each other, the dirty bit 24 is 1. Therefore, the dirty bit 24 is caused to be 1 by writing (rewriting) of data by the processor 1.

When receiving a correction execution signal from the ECC circuit 3 at the time of reading data from the main memory 4, the cache memory 2 (the cache controller 20) stores the data onto a cache line and causes the dirty bit 24 to be 1. This is because the data differs from the data on the main memory 4 due to the correction.

When data is acquired from the main memory 4 onto a cache line without being corrected by the ECC circuit 3, or when data on a cache line is written back to the main memory 4, the dirty bit 24 is 0.

Figure 2:
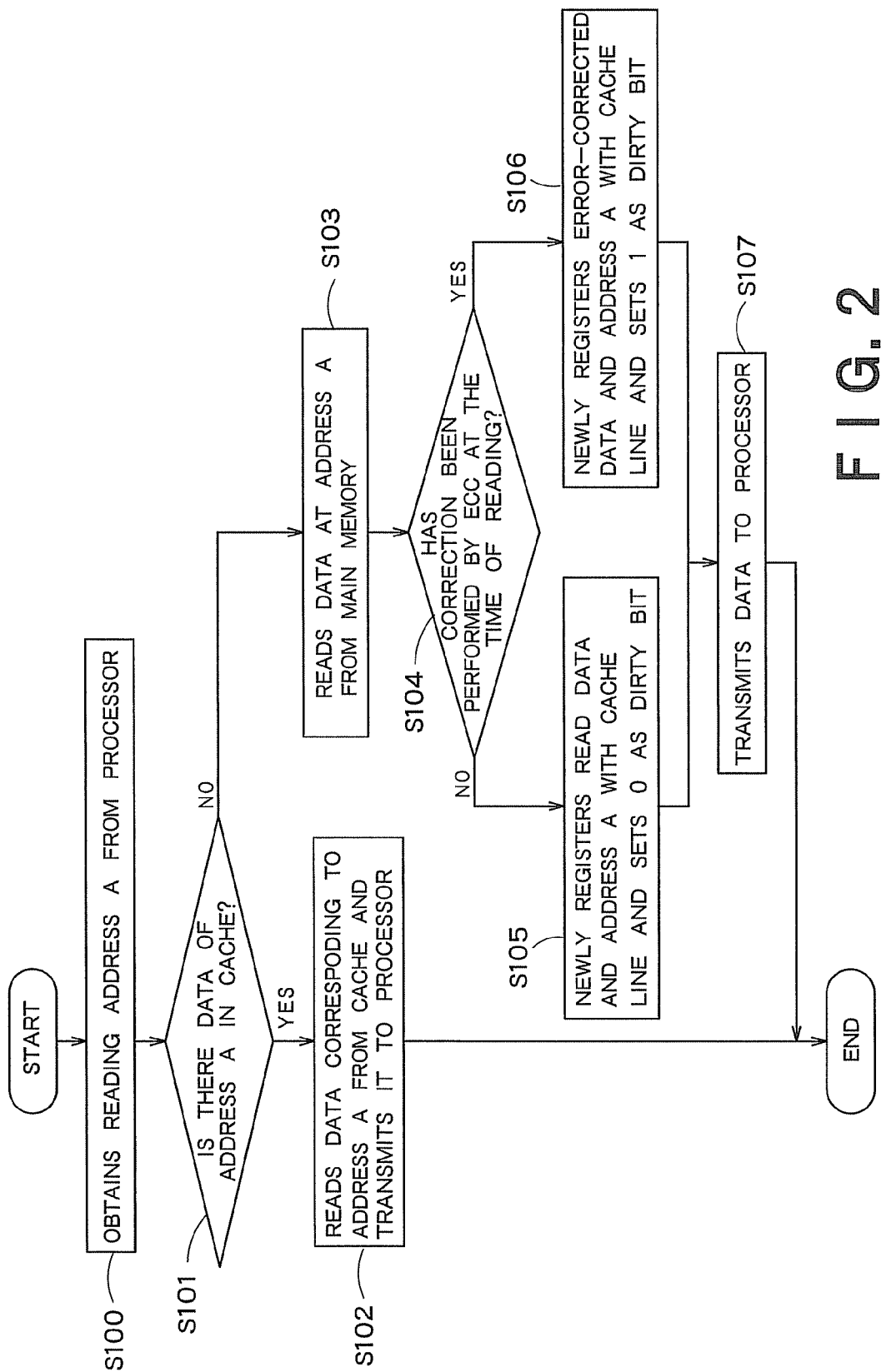
FIG. 2 is a flowchart illustrating data reading processing according to the embodiment.

The operation performed when the processor 1 reads data will be described with the use of the flowchart shown in FIG. 2.

(Step S100) The cache controller 20 receives an address A of data to be read from the processor 1.

(Step S101) The cache controller 20 checks whether or not the same address as the address A exists in any address area of the cache data holding section 21. If it exists, the flow proceeds to step S102, and, if it does not exist, the flow proceeds to step S103.

(Step S102) Data stored in the data area 23 of such a cache line that the same address as the address A is stored in the address area 22 is read and transmitted to the processor 1.

(Step S103) Data at the address A of the main memory 4 is read and ECC-decoded.

(Step S104) If error correction has been performed by the ECC circuit 3 at the time of data reading (ECC decoding) at step S103, the flow proceeds to step S106, and otherwise, the flow proceeds to step S105.

(Step S105) The data read from the main memory 4 and the address A are stored into the cache line, and 0 is set as the dirty bit 24.

(Step S106) The data read from the main memory 4 and error-corrected by the ECC circuit 3 and the address A are stored into the cache line. The cache controller 20 receives a correction execution signal from the ECC circuit 3 and sets 1 as the dirty bit of this cache line.

(Step S107) The data stored into the cache line is transmitted to the processor 1.

As described above, in the case where data is error-corrected when being read from the main memory 4 and becomes different from the data on the main memory 4, the cache controller 20 sets 1 as the dirty bit 24 on the basis of a correction execution signal, and records that it is necessary to write back the data to the main memory 4.

When data is stored into a cache line at steps S105 and S106, the cache controller 20 secures a new cache line. The cache controller 20 first looks for an unused cache line and uses the unused cache line if any. If there is not any unused cache line, the cache controller 20 clears any cache line the dirty bit 24 of which is 0 and uses it. If there is not any cache line the dirty bit 24 of which is 0, then the cache controller 20 writes back data in any cache line to the main memory 4, and clears and uses it.

Figure 3:
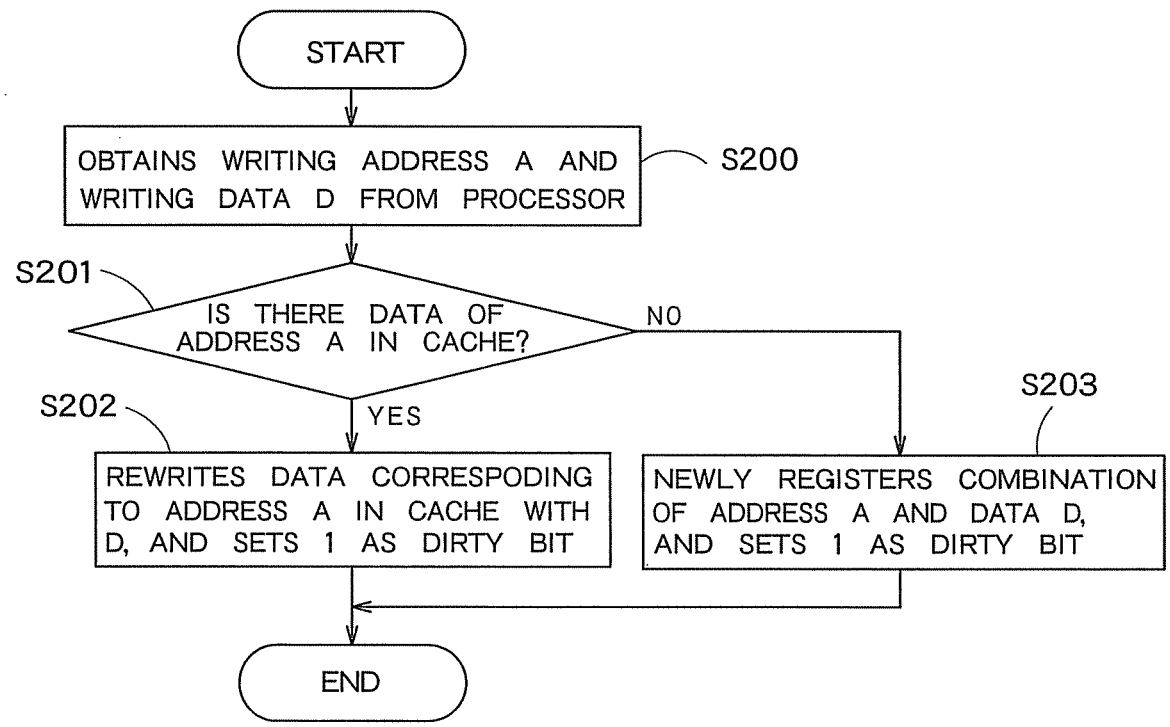
FIG. 3 is a flowchart illustrating data writing processing according to the embodiment.

Next, the operation performed when the processor 1 writes data will be described with the use of the flowchart shown in FIG. 3.

(Step S200) The cache controller 20 receives data D to be written and an address A from the processor 1.

(Step S201) The cache controller 20 checks whether or not the same address as the address A exists in any address area of the cache data holding section 21. If it exists, the flow proceeds to step S202, and, if it does not exist, the flow proceeds to step S203.

(Step S202) Data stored in the data area 23 of such a cache line that the same address as the address A is stored in the address area 22 is rewritten with data D, and the dirty bit is set to 1.

(Step S203) A new cache line is secured; combination of the address A and the data D is stored into the cache line; and the dirty bit is set to 1.

As described above, when the processor 1 writes data, it writes the data to a cache line, sets the dirty bit 24 to 1, and records that it is necessary to write back the data to the main memory 4.

An example of writing back from the cache memory 2 to the main memory 4 will be described with the use of the flowchart shown in FIG. 4. This is performed in the background while the main memory 4 is not accessed.

(Step S300) It is detected whether or not there is a cache line the dirty bit of which is 1 in the cache data holding section 21. If there is such a cache line, the flow proceeds to step S301.

(Step S301) One cache line the dirty bit of which is 1 is taken out and targeted by writing back.

(Step S302) The address A and the data D are taken out from the cache line targeted by writing back.

(Step S303) The data D is ECC-coded and written at the address A of the main memory 4.

(Step S304) The dirty bit of the cache line targeted by writing is changed to 0.

(Step S305) It is judged whether or not writing back is continued. If writing back is continued, the flow returns to step S300.

Through such processing, it is possible to write data in such a cache line as requires writing back, that is, a cache line the dirty bit of which is 1, to the main memory 4.

Writing back to the main memory 4 is also performed in the case where there is neither an unused cache line nor a cache line the dirty bit of which is 0 when the processor 1 secures a new cache line at the time of reading or writing data.

The cache memory according to this embodiment refers to a correction execution signal outputted from the ECC circuit when storing data read from the main memory into the cache memory, and, if correction has been performed, the cash memory sets a dirty bit to 1 and records that writing back is necessary. Therefore, it is possible to certainly write this data back to the main memory without causing the data to disappear.

This can be realized only by adding a function of, at the time of storing data read from a main memory, setting 1 as a dirty bit if the data has been corrected by an ECC circuit, to a conventional write-back type cache memory.

In the embodiment described above, an example has been shown in which the unit of data written or read by the processor is the same as the unit of cache line management. However, the units may differ from each other. For example, if the data size of the data area 23 of a cache line is 128 bits, and the size of data reading/writing by the processor 1 is 32 bits, data is read from a main memory in units of 128 bits and stored into a cache line, and 32 bits among the 128 bits are transmitted to the processor 1. If error correction is performed by the ECC circuit 3 at the time of data reading from the main memory 4, the dirty bit is set to 1.

In the case where ECC coding is performed in units of 64 bits, it is possible to provide two bits as dirty bits for one cache line and manages whether or not writing back is necessary, in units of 64 bits.

If, when the processor writes 32-bit data to the main memory, a corresponding cache line does not exist in the cache memory, 128-bit data at a corresponding address is read from the main memory and stored into a cache line first. Then, data corresponding to 32 bits among the data in the cache line is rewritten.

Furthermore, it is also possible to manage which part of the 128-bit data in the cache line is effective data, in units of 32 bits, and write back only the effective part to the main memory. When the processor performs writing, it is recorded that the 32-bit part to be written by the processor, among the 128-bit data stored in the cache line, is effective data.

Figure 5:
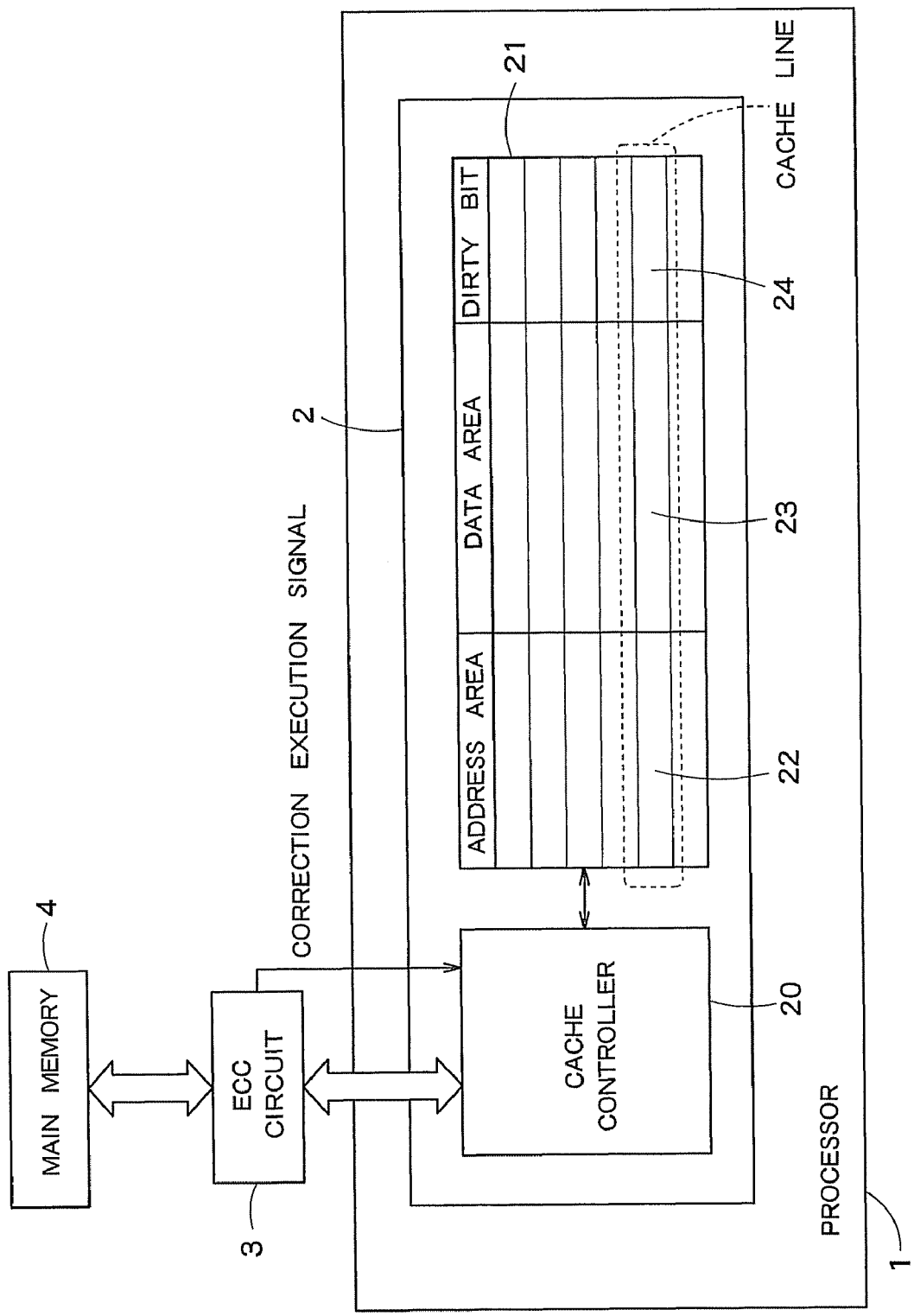
FIG. 5 is a block diagram of a computer system according to a variation embodiment.

In the embodiment described above, the ECC circuit 3 is included in the processor 1, and ECC-attached data is handed over between the processor 1 and the main memory 4. However, the ECC circuit 3 may be provided outside the processor 1 as shown in FIG. 5. In this case, data which is not attached with an ECC is handed over between the processor 1 and the ECC circuit 3.

The ECC circuit 3 may be incorporated as a part of a memory controller or may be included in a memory chip.

Even in the case where the processor has a instruction cache and a data cache separately, the method according to the above embodiment is applicable. For example, in the case where the instruction cache is dedicated for reading, when error correction is performed by the ECC circuit at the time of storing data read from the main memory into the instruction cache, the cache controller of the data cache configured similarly to the cache memory 2 according to the above embodiment stores combination of the address and the data into a cache line of the data cache, on the basis of a correction execution signal outputted from the ECC circuit 3 and sets 1 as a dirty bit. Thereby, it is possible to surely write back data stored into the instruction cache dedicated for reading to the main memory.

The above embodiment is applicable to various cache memory systems such as a direct mapping system and a set associative system.

In the above embodiment, various kinds of memories can be used, such as an SRAM, a DRAM, a PRAM, a PCRAM and a flash memory, in addition to an MRAM and an ReRAM.

What is claimed is:
1. A memory access method comprising:
receiving a reading instruction and a reading address from a processor;
comparing an address stored in an address area of each of multiple cache lines included in a cache memory with the reading address;
reading error-correction-coded data corresponding to the reading address which is stored in a main memory if the address stored in the address area does not correspond to the reading address;
performing error correction decoding of the error-correction-coded data;
detecting presence or absence of an error in the error-correction-coded data;
correcting the error-correction-coded data if there is an error in the error-correction-coded data to yield corrected data, and outputting a correction execution signal indicating that correction has been performed;
storing the corrected data in a data area of one of the multiple cache lines;
storing the reading address in the address area of the one of the multiple cache lines;
setting a dirty bit of the one of the multiple cache lines to 1 based on the correction execution signal; and
transmitting the corrected data stored in the data area to the processor.

2. The memory access method according to claim 1, further comprising:
if there is not an error in the error-correction-coded data:
storing the error-correction-coded data in the data area of the one of the multiple cache lines;
storing the reading address in the address area of the one of the multiple cache lines;
setting the dirty bit of the one of the multiple cache lines to 0; and
transmitting the error-correction-coded data stored in the data area to the processor.

3. A computer system, comprising:
a main memory in which error-correction-coded data is stored;
an error correction circuit that performs error correction coding of data to be written into the main memory, error correction decoding of data read from the main memory, and error presence detection, wherein the error correction circuit corrects an error in response to detection of the error in the data read from the main memory, and outputs a correction execution signal indicating whether error correction has been made;
a processor that outputs a reading instruction and a reading address; and
a cache memory having multiple cache lines that respectively include an address area, a data area, and a dirty bit, and a cache controller that reads data from the reading address on the main memory via the error correction circuit based on the reading instruction, stores the reading address into the address area of one of the multiple cache lines, stores the data from the reading address into the data area, and sets the dirty bit to a predetermined value based on the correction execution signal,
wherein the cache controller:
compares addresses stored in respective address area of respective cache lines of the multiple cache lines with the reading address,
transmits data stored in a data area of one of the multiple cache lines, corresponding to the reading address, and
reads data from the reading address on the main memory via the error correction circuit based on the reading instruction, stores the reading address into an address area of the one of the multiple cache lines, stores the data from the reading address into the data area, and sets the dirty bit to 1 if error correction has been performed by the error correction circuit and sets the dirty bit to 0 if error correction has not been performed if the reading address does not correspond to the address stored in the address area of the respective cache lines.

4. The computer system according to claim 3, wherein
the processor outputs a writing instruction, a writing address, and data to be written to the cache controller, and
the cache controller compares addresses stored in respective address areas of each of the multiple cache lines with the writing address based on the writing instruction and the writing address, stores the data to be written in the data area of a corresponding cache line of the multiple cache lines, and sets the dirty bit to 1.

5. The computer system according to claim 4, wherein, if no addresses stored in the respective address areas of each of the multiple cache lines correspond to the writing address, the cache controller stores the writing address in the address area of one of the multiple cache lines, stores the data to be written in the data area of the one of the multiple cache lines, and sets the dirty bit to 1.

6. The computer system according to claim 3, wherein the cache controller extracts the data stored in a data area of a selected cache line having 1 set as the dirty bit and the address stored in an address area of the selected cache line yielding extracted data and an extracted address, respectively, writes back the extracted data to the extracted address on the main memory via the error correction circuit, and changes the dirty bit of the selected cache line to 0.

7. The computer system according to claim 3, wherein the main memory is a magnetoresistive random access memory (MRAM).

8. The computer system according to claim 3, wherein the main memory is a non-volatile semiconductor storage device using a resistance storage element capable of reversibly switching between a high-resistance state and a low-resistance state.

9. The computer system according to claim 3, further comprising a instruction cache memory, wherein
in response to data read from the main memory and stored in the instruction cache memory being error-corrected by the error correction circuit, the cache controller stores the data stored in the instruction cache memory and an address on the main memory corresponding to the data into one of the multiple cache lines based on the correction execution signal, and sets the dirty bit to 1.

* * * * *